United States Patent [19]

Horner et al.

[11] 4,347,350
[45] Aug. 31, 1982

[54] POLYESTER COMPOSITIONS CONTAINING RESIDUES OF DIHYDROXYALKOXY COUMARINS

[75] Inventors: Patrick J. Horner, Welwyn Garden City; Robert B. Rashbrook, Hatfield, both of England

[73] Assignee: Imperial Chemical Industries Limited, London, England

[21] Appl. No.: 210,755

[22] Filed: Nov. 28, 1980

[30] Foreign Application Priority Data

Dec. 10, 1979 [GB] United Kingdom ................. 7942481

[51] Int. Cl.$^3$ ............................................ C08G 63/66
[52] U.S. Cl. ..:................................. 528/190; 528/193; 528/195
[58] Field of Search .................... 528/190, 193, 195; 260/45.95 F, 45.75 N

[56] References Cited

U.S. PATENT DOCUMENTS 3,994,907 11/1976 Domergue ...................... 260/295 F
4,057,532 11/1977 Saferstein ............................ 528/190
4,224,433 9/1980 Calundann .......................... 528/128
4,284,756 8/1981 Horner ................................ 528/190

OTHER PUBLICATIONS

European Patent Application, published 9-1-80, #6686, Horner et al.

Primary Examiner—Lester L. Lee
Attorney, Agent, or Firm—Cushman, Darby & Cushman

[57] ABSTRACT

UV stable linear polyesters, e.g. polyethylene terephthalate, contain in their chain copolymerized esterification residues of di(hydroxyalkoxy)coumarins. The polyesters are useful for making biaxially oriented films. The polyesters can be made by polycondensation in the presence of 4-methyl-6,7-dihydroxy-coumarin.

7 Claims, 1 Drawing Figure

POLYESTER COMPOSITIONS CONTAINING RESIDUES OF DIHYDROXYALKOXY COUMARINS

Linear polyesters have only poor stability under the influence of UV irradition. It is an object of this invention to improve the UV stability of linear polyesters.

Linear polyesters are well known thermoplastic polymers which have chains consisting of alternating esterification residues of glycols and dicarboxylic acids, the esterification residues being connected by means of ester linkages. Many acids and glycols have been proposed for the preparation of linear polyesters. The acids include (a) terephthalic acid, (b) isophthalic acid, (c) naphthalene-2,6-dicarboxylic acid, and (d) bis(carboxyphenoxy)ethane. The glycols include alkane diols with 2 to 10 carbon atoms (e.g. ethylene glycol and 1,4-butane-diol), and 1,4-dimethylol-cyclohexane. By far the commonest polyester is poly(ethylene terephthalate). Other commercially used linear polyesters include (a) a copolymer of ethylene glycol with a mixture of terephthalic acid and isophthalic acid said mixture containing 80 to 95 mole % of the terephthalic acid, (b) a polymer of 1,4-butanediol and terephthalic acid, and (c) homopolymer of terephthalic acid and 1,4-dimethylolcyclohexane.

According to this invention a linear polyester contains in its molecule esterification residues of di(hydroxyalkoxy)coumarins, preferably 4-methyl-di(hydroxyalkoxy)coumarins, the amount of the said di(hydroxyalkoxy)coumarins being 0.05 to 10% by weight, preferably 0.05 to 5% by weight, based on the total polymer.

For example such a linear polyester has an IV above 0.50 and it contains in its molecule esterification residues of:
 (A) Dicarboxylic acids selected from
 (i) terephthalic acid
 (ii) isophthalic acid
 (iii) naphthalene-2,6-dicarboxylic acid
 (iv) bis(carboxyphenoxy)ethane;
 (B) Glycols with 2 to 10 carbon atoms in the molecule, e.g. ethylene glycol, 1,4-butane diol and 1,4-dimethylolcyclohexane; and
 (C) di(hydroxyalkoxy)coumarins; the amount of (C) being between 0.05 and 10% by weight, preferably 0.05 and 5% by weight based on the amount of (A)+(B)+(C).

An important class of linear polyesters according to the invention have as repeating unit:

—OYO—CO—X—CO— wherein
 at least 80 mole% of the X groups represent p-phenylene and the remainder represent m-phenylene and
 at least 90% of the Y groups represent $-C_nH_{2n}-$ where n is an integer from 2 to 10, e.g. $-CH_2-CH_2-$, and at least 0.1% of the Y groups represent esterification residues of di(hydroxyalkoxy)coumarins, preferably 4-methyl-di(hydroxyalkoxy)coumarins, the preferred esterification residues having the formula 1 where n' and n" are integers from 1 to 10, e.g. n'=n"=2.

(Formula 1 is given in the accompanying drawing.) 

The invention includes polyesters as described above which also contain in their molecule 0.05 to 10% by weight, preferably 0.05 to 5% by weight, of esterification residues of 2,4-dihydroxy-benzoic acid. Preferably the mole ratio of coumarin to benzoic acid residues is 1:1 to 1:0.7.

Linear polyesters are obtained by a two-stage process. A precursor is obtained in the first stage. This precursor is a low molecular weight ester of the glycol and the dicarboxylic acid. In the second stage the precursor is subjected to polycondensation to increase its molecular weight and thereby obtain the polyester.

There are two common methods for preparing the precursor. In the ester interchange method the glycol is reacted with a dialkyl ester of the dicarboxylic acid. A low molecular weight alcohol is removed thus forming the glycol ester by ester interchange. For example ethylene glycol is reacted with dimethyl terephthalate to form ethylene glycol terephthalate and methyl alcohol (which is removed by distillation). The rate of reaction can be increased by incorporating ester interchange catalysts in the reaction mixture. Suitable ester interchange catalysts include zinc acetate, manganese acetate, calcium acetate, cobalt acetate and titanium tetraisopropoxide.

In the direct esterification method the glycol and the acid are esterified to form the glycol ester with the removal of water, e.g. ethylene glycol is esterified with terephthalic acid. It is usual to carry out direct esterification without catalysts. However, under the acidic conditions which apply during direct esterification, ethylene glycol tends to dimerise according to the reaction:

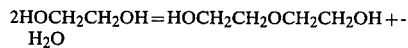

Some of the diethylene glycol produced by this reaction gets incorporated into the polymer chain but small amounts cause no adverse effects except a lowering of the softening point. The formation of diethylene glycol can be reduced, and hence the softening point kept at a satisfactory level, by including an alkaline compound, e.g. sodium hydroxide, in the direct esterification reaction mixture.

The second stage is carried out by heating the precursor at a temperature above its melting point under low pressure, e.g. below 5 mbar, with stirring. During polycondensation glycol is eliminated (and removed by distillation). As the reaction proceeds the molecular weight and viscosity increase. The increase in viscosity can be used to ascertain when the desired molecular weight has been achieved; usually the reaction is terminated when the IV is in the range of 0.5 to 1.0.

Polycondensation catalysts are usually incorporated during the polycondensation. Suitable polycondensation catalysts include antimony trioxide, germanium dioxide, mixtures of these two, titanium alkoxides, lead oxides and zinc. Some catalysts, e.g. germanium dioxide, are conveniently dissolved in alkali before they are added to the reaction system. In such cases it is particularly appropriate to utilise the alkali which is present in the direct esterification stage to dissolve the catalyst (even though the catalyst has no effect upon the direct esterification).

The metals present during stage 1 remain in the polymer and, when colourless products are needed, it is necessary to avoid the residues being in the form of coloured derivatives. An acid of phosphorus or an ester of such an acid can be added to the polycondensation mixture; these compounds reduce the colour caused by the metals. Specific examples of phosphorus compounds suitable for adding to the polycondensation reaction include phosphoric acid, triphenyl phosphates and phosphorous acid.

European patent application 0 006 686 published on Jan. 9, 1980, describes a method of making linear polyesters, especially polyethylene terephthalate, by polycondensation in the presence of 0.04% to 20% by weight, preferably 0.04 to 5% by weight, based on the total reactants of a dihydric phenol heat stable at 250° C. The use of 2,2',4,4'-tetrahydroxybenzophenone to produce polyesters containing xanthone residues is particularly described.

It is well known that phenols are difficult to esterify with carboxylic acids and therefore phenols cannot readily be incorporated into the chain of a polyester by this method. We have found, most unexpectedly, that phenolic groups that are not intramolecularly hydrogen bonded react with (combined or uncombined) glycol present in the system to form an ether linkage thereby converting the phenol to a hydroxyalkoxy derivative. This derivative forms ester linkages with acid residues in the precursor. The overall reaction can be represented as follows (where HOOCACOOH represents the dicarboxylic acid; HOGOH represents the glycol and HOXOH represents the phenol)

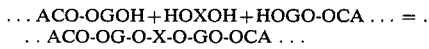
...ACO-OGOH+HOXOH+HOGO-OCA... = .
..ACO-OG-O-X-O-GO-OCA...

We have no evidence of the mechanism whereby the reaction occurs but we are able to demonstrate the overall effect because:

(a) the phenol cannot be extracted or detected in the polyester, (b) if the polyester is hydrolysed to its acid and glycol the hydroxyalkoxy derivative of the phenol is present in the hydrolysate, (c) the spectrographic results are compatible with the structure proposed for the product of the reaction.

Our invention includes two methods of preparing linear polyesters containing residues of di(hydroxyalkoxy)coumarins (i.e. polyesters as described above).

METHOD 1

The linear polyesters are prepared by polycondensation in the presence of 0.04 to 10% by weight, preferably 0.04 to 5% by weight, based on the total reactants, of a dihydroxy-coumarin (which may be added either to the precursor or the ingredients from which the precursor is prepared). Suitable compounds include:

COUMARINS 6,7-dihydroxy-coumarin
7,8-dihydroxy-coumarin
5,7-dihydroxy-coumarin

4-METHYL COUMARINS 4-methyl-6,7-dihydroxy-coumarin
4-methyl-7,8-dihydroxy-coumarin
4-methyl-5,7-dihydroxy-coumarin

METHOD 2

The linear polyesters are prepared by incorporating a di(hydroxyalkoxy)coumarin, preferably the 4-methyl-6,7 isomer, in either the precursor or the ingredients from which the precursor is prepared. The preferred alkoxy group is ethoxy.

Method 2 is particularly suitable for polyesters based on glycols other than ethylene glycol, e.g. polybutyleneterephthalate.

The polyesters according to the invention can be converted to shaped articles which have good stability to UV irradiation. The shaped articles include fibre and films, e.g. metallised film and coextruded laminates which have the polymer according to the invention as one or both outer layers. The metallised films may be used as reflectors in solar energy collectors. The transparent films may be used as windows, greenhouses, cloches, transparent coverings for solar cells.

The shaped articles may be made entirely from the polyesters according to the invention or they may be made from blends of this polymer and conventional polyesters.

The preparation of a polymer according to the invention will now be described by way of example.

EXAMPLE 1

This Example describes the preparation of a linear polyester according to the invention using a two-stage process comprising (1) direct esterification followed by (2) polycondensation. To start Stage 1, the following reactants were charged to an autoclave:

60.5 kg—terephthalic acid
30 liters—ethylene glycol
3.5 g—germanium dioxide
3.5 g—sodium hydroxide (For convenience of handling the GeO$_2$ and the NaOH were both dissolved in the same small portion, about 50 g, of the ethylene glycol).

The autoclave was pressurised to about 3 atm and heated with stirring. The reaction commenced and water of esterification was removed with some of the excess of glycol. The temperature remained at the reflux temperature. All the water of esterification had been removed in about 2.5 hours when the temperature had risen to 248° C. The pressure was released over a period of about 5 minutes and a small amount (about 5 liters) of glycol removed. This completed the (conventional) direct esterification and 119 g of triphenylphosphate (in methanol) were added. 77 kg of product, which was a conventional precursor for the preparation of polyethylene terephthalate, were obtained and used for polycondensation.

The precursor was then transferred to the polycondensation vessel and prepared for Stage 2, i.e. polycondensation, by the addition of 700 g 4-methyl-6,7-dihydroxy-coumarin, i.e. 0.9% by weight of the precursor, and 21 g of antimony trioxide.

Removal of glycol was started by distillation at 230° C. under atmospheric pressure with stirring. When the distillation had started, the pressure was slowly reduced to 0.3 m bar and the temperature was kept at 290° C. The pressure was allowed to return to atmospheric, the polymer was removed from the polycondensation vessel and cut into chip. The total weight of the polymer was 61 kgs. It is emphasized that the preparation described in Example 1 is conventional except for the addition of the coumarin derivative. The polymer was film-forming quality poly(ethylene terephthalate) having an IV of 0.6 and a softening point of 254° C. It contained about 1% by weight of residues of 4-methyl-6,7-di(hydroxyethoxy)coumarin, i.e. residues of Formula 1 where $n=n'=2$.

EXAMPLE 2

The polymer from Example 1 was used to prepare film according to the invention. The chip from Example 1 was converted to biaxially oriented film 125 μm thick which contained about 1% of the coumarin residues. The film had useful UV screening properties.

EXAMPLE 3

This Example describes the preparation of a linear polyester according to the invention using a two-stage process comprising (1) direct esterification followed by (2) polycondensation. To start Stage 1, the following reactants were charged to an autoclave:

60.5 kg—terephthalic acid
30 liters—ethylene glycol
0.7 kg—4-methyl-6,7-dihydroxy-coumarin
3.5 g—germanium dioxide
3.5 g—sodium hydroxide (For convenience of handling the $GeO_2$ and the NaOH were both dissolved in the same small portion, about 50 g, of the ethylene glycol.)

The autoclave was pressurised to about 3 atm and heated with stirring. The reaction commenced and water of esterification was removed with some of the excess of glycol. The temperature remained at the reflux temperature. All the water of esterification had been removed in about 2.5 hours when the temperature had risen to 248° C. The pressure was released over a period of about 5 minutes and a small amount (about 5 liters) of glycol removed. This completed the direct esterification and 119 g of triphenylphosphate (in methanol) were added. 77 kg of product, which was a conventional precursor for the preparation of polyethylene terephthalate, were obtained and used for polycondensation. The precursor was then transferred to the polycondensation vessel and prepared for Stage 2, by the addition of 21 g of antimony trioxide. Removal of glycol was started by distillation at 230° C. under atmospheric pressure with stirring. When the distillation had started the pressure was slowly reduced to 0.3 m bar and the temperature was kept at 290° C. The pressure was allowed to return to atmospheric, the polymer was removed from the polycondensation vessel and cut into chip. The total weight of the polymer was 61 kg.

It is emphasized that the preparation described in Example 3 is also conventional except for the addition of the 4-methyl-6,7-dihydroxy-coumarin. The polymer was film-forming quality poly(ethylene terephthalate) having an IV of 0.6 and a softening point of 254°. It contained about 1% by weight of residues of 4-methyl-6,7-di(hydroxyethoxy)coumarin, i.e. residues of Formula 1 where $n'=n''=2$. Film was prepared from the polymer which had the same film forming properties as the polymer of Example 1 but its UV stability was even better than that of Example 1.

Analysis of the polymer of Example 3 and the films made from it showed:

(a) there was no detectable 4-methyl-6,7-dihydroxycoumarin, (b) after hydrolysis of polymer and film to terephthalic acid and ethylene glycol, there was no detectable 4-methyl-6,7-dihydroxy-coumarin in the hydrolysate, (c) the hydrolysate contained 4-methyl-6,7-dihydroxy ethoxy-coumarin but this compound could not be extracted from the polymer or film.

EXAMPLE 4

Residues of 4-methyl-6,7-dihydroxyethoxy-coumarin were incorporated into poly(butyleneterephthalate) using a two stage method wherein stage 1 comprised ester interchange between 1,4-butane diol and dimethyl terephthalate and stage 2 comprised polycondensation of the precursor of stage 1 in the presence of 4-methyl-6,7-dihydroxyethoxy-coumarin.

To carry out stage 1 the following were charged to the ester interchange vessel:

640 g—dimethylterephthalate
593 g—1,4-butanediol
0.1 g—titanium tetraisopropoxide.

(The third ingredient, the transesterification catalyst, was added as 1% solution in butanol.)

The reaction mixture was initially heated at 156° C. and the heating continued until 267 mls of methanol had been collected when the temperature of the reaction mixture had risen to 218° C. The reaction mixture was allowed to cool to 170° C. when it was poured into a tray where it solidified at room temperature. It cooled to a white solid which was the precursor for stage 2.

To carry out stage 2 (polycondensation) the following reactants were used:

100 g—Precursor (from stage 1)
2.0 g—4-methyl-6,7-dihydroxyethoxy-coumarin
0.6 g—titanium tetraisopropoxide.

The polycondensation mixture was heated at 245° C. under 0.4 mm Hg until a suitable melt viscosity had been achieved.

The product was poly(tetramethylene terephthalate) which contained residues of the 4-methyl-6,7-di(hydroxy ethoxy)coumarin. It had excellent UV stability and UV screening properties.

EXAMPLE 5

The method of Example 1 was repeated adding 700 g of 4-methyl-6,7-di(hydroxyethoxy)coumarin to the polycondensation mixture instead of 700 g 4-methyl-6,7-dihydroxy-coumarin.

The resultant polyester contained about 1% by weight of 4-methyl-6,7-di(hydroxyethoxy)coumarin residues and it was substantially the same as that of Example 1. It more closely resembled the product of Example 4 in that it had very good UV stability and UV screening properties.

EXAMPLE 6

The method of Example 1 was repeated using 2,6-naphthalene-dicarboxylic acid instead of terephthalic acid.

EXAMPLE 7

A precursor was obtained by transesterifying the following ingredients:

70 kg—dimethylester of bis(carboxyphenoxy)ethane
35 liter—ethylene glycol
30 g—manganese acetate (catalyst)

1400 g of 4-methyl-6,7-dihydroxy-coumarin and 35 g antimony oxide were added to the precursor and the mixture subjected to polycondensation as described in Example 1.

The polyester of Examples 6 and 7 had good properties, including good UV stability. The results showed that the coumarin was converted into 4-methyl-6,7-di(hydroxyethoxy)coumarin residues which were incorporated in the polyester chain.

We claim:

1. A linear polyester which contains in its molecule esterification residues of di(hydroxyalkoxy)coumarins selected from the group consisting of 6,7-di(hydroxyalkoxy)-coumarin, 7,8-di-(hydroxyalkoxy)-coumarin, 5,7-di(hydroxyalkoxy)-coumarin, 4-methyl-6,7-di(hydroxyalkoxy)-coumarin, 4-methyl-7,8-di(hydroxyalkoxy)-coumarin and 4-methyl-5,7-di(hydroxyalkoxy)-coumarin, the amount of said residues being 0.05 to 10% by weight based on the total polymer.

2. A polyester according to claim 1, in which the amount of the said esterification residues is 0.05 to 5% by weight based on the total polymer.

3. A linear polyester which has as its repeating unit:

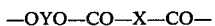

wherein at least 80 mole % of the X groups represent p-phenylene and the remainder represent m-phenylene and at least 90% of the Y groups represent —$C_nH_{2n}$— where n is an integer from 2 to 10 and at least 0.1% of the Y groups represent esterification residues of di(hydroxyalkoxy)-coumarins selected from the group consisting of 6,7-di(hydroxyalkoxy)-coumarin, 7,8-di-(hydroxyalkoxy)-coumarin, 5,7-di(hydroxyalkoxy)-coumarin, 4-methyl-6,7-di(hydroxyalkoxy)-coumarin, 4-methyl-7,8-di(hydroxyalkoxy)-coumarin and 4-methyl-5,7-di(hydroxyalkoxy)-coumarin.

4. A polyester according to claim 3, in which the residues are residues of 4-methyl-di(hydroxyalkoxy)-coumarins having formula 1

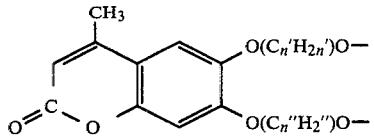

where n' and n'' are integers from 1 to 10.

5. A linear polyester according to claim 4 in which n'=n''=2.

6. A method of making a polyester according to claim 5, which comprises polycondensing a glycol terephthalate precursor, characterised in that the polycondensation is carried out in the presence of 4-methyl-6,7-dihydroxy-coumarin.

7. Shaped articles obtained from a polyester according to claim 1.

* * * * *